Nov. 18, 1969     H. W. SCHAAF     3,479,081

BODY MOUNT

Filed April 22, 1968

INVENTOR.

Henry W. Schaaf

BY Herbert Furman

ATTORNEY

United States Patent Office

3,479,081
Patented Nov. 18, 1969

3,479,081
BODY MOUNT
Henry W. Schaaf, Ortonville, Mich., assignor to General Motors Corporation, Detroit, Mich., a corporation of Delaware
Filed Apr. 22, 1968, Ser. No. 722,963
Int. Cl. B62d 23/00, 27/04
U.S. Cl. 296—35                                                4 Claims

ABSTRACT OF THE DISCLOSURE

A body mount includes an annular elongated metal member having a series of expandable ribs adjacent an internally threaded end thereof. An annular body of elastomeric material surrounds the annular member and includes an annular flange adjacent the other end of the elongated member. Wear plates are bonded to the surfaces of the flange and one of the plates includes depending lateral tabs which are bonded to thin upper portions of integral elastomeric ribs extending from the flange. The lower portions of the ribs taper axially and circumferentially and extend over the portion of the elastomeric body covering the expandable ribs. The flange fits between the frame and the body and the tabs are received within slots opening to the aperture in the frame through which the expandable ribs extend. When a bolt is threaded into the threaded end of the elongated member to expand the ribs, the portion of the elastomeric body covering the ribs is compressed against the frame and the tabs block rotational movement of the mount as it is being expanded. The one wear plate, the tabs, and the upper edges of the lower portions of the ribs provide for reverse usage when there is no access to the bolt through the body.

---

This invention relates to body mounts and more particularly to an improved body mount for mounting vehicle bodies on vehicle frames.

Conventionally, vehicle bodies are mounted on vehicle frames by a number of body mounts which generally comprise annular apertured discs of rubber or other hard elastomeric material which fit between the body and the frame, with the body and the frame being bolted together through the mount. In certain bodies it is difficult, if not impossible, to thread a nut on the bolt due to inaccessibility to the threaded end of the bolt or interference from parts of the frame.

The body mount of this invention requires access to the bolt head from either the body or the frame but not both, and can therefore be used for substantially all bodies. Additionally, no accessibility to the threaded end of the bolt is required.

In the preferred embodiment of the invention, the mount generally includes an annular metal member having an axially slotted portion adjacent an internally threaded end to provide a series of radially expandable ribs. An annular body of elastomeric material surrounds the metal member and the expandable ribs and includes an integral flange which fits between the body and the frame to space one from the other. Metal plates are bonded to the opposite surfaces of the flange to act as wear plates. One of the plates includes lateral tabs which are bonded to thin upper rib portions integral with the flange and the elastomeric body. Lower rib portions are integral with the upper portions and taper axially and circumferentially as they extend over the portion of the elastomeric body covering the expandable ribs. The one metal plate, the lateral tabs thereof, and the upper edges of the lower rib portions provide grooves which receive edge portions of slots in either the frame member or the body member to detchably retain the body mount in place upon limited rotational movement of the mount after it has been installed. When a bolt is threaded into the threaded end of the annular metal member, the expandable ribs compress the elastomeric material covering these ribs against the frame or body.

It can be seen that access to the bolt head is required only from either the body or the frame and that no nut or other separable fastener is required in order to expand the ribs. Further, the body mount is both self-locking and self-retaining and the compression of the flange of elastomeric material between the body and the frame as well as the compression of the elastomeric material covering the ribs provides a tight, rattle-free connection between the body and the frame.

The primary object of this invention is to provide an improved body mount for securing and supporting a vehicle body to a vehicle frame and requiring access only from either the body or the frame. Another object of this invention is to provide an improved body mount which includes a series of radially expandable ribs covered with elastomeric material and located to the blind side of a vehcile frame or body for expansion from an accessible side of the body or frame to thereby secure and mount a vehicle body on a vehicle frame .

These and other objects of this invention will be readily apparent from the following specification and drawings wherein.

Figure 1:
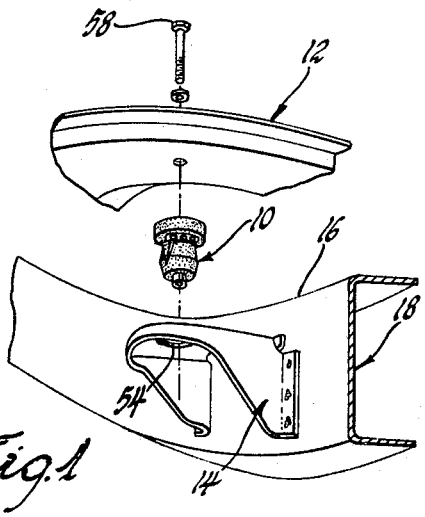
FIGURE 1 is fragmentary exploded perspective view of a portion of a vehcile frame, a vehicle body, and a body mount according to this invention.
Figure 2:
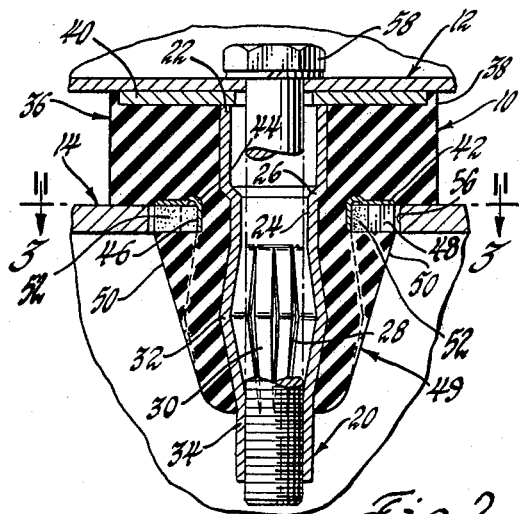
FIGURE 2 is an enlarged sectional view of the unexpanded body mount located in place between the body and the frame.
Figure 3:
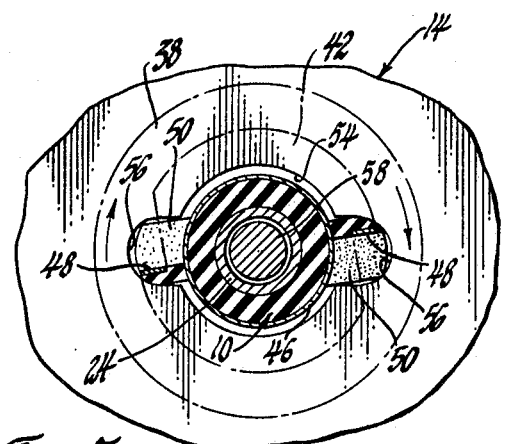
FIGURE 3 is a sectional view taken generally along the plane indicated by line 3—3 of FIGURE 2.
Figure 4:
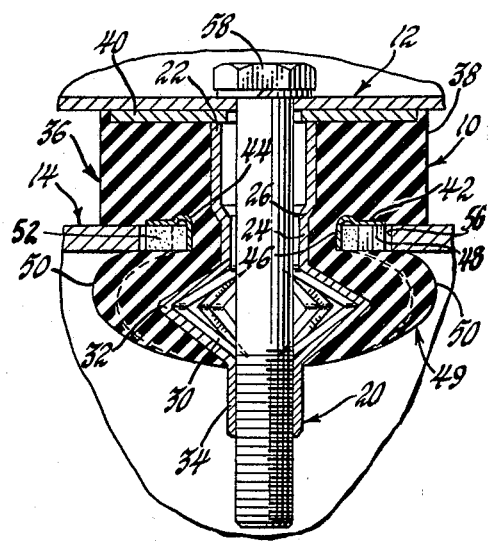
FIGURE 4 is a view similar to FIGURE 2 showing the body mount expanded.

Referring now to the drawings, a body mount according to this invention, generally designated 10, resiliently supports a conventional vehicle body bracket 12 on a conventional vehicle frame outrigger bracket 14 to resiliently mount and secure a vehicle body, not shown, on the rail 16 of the frame 18.

The body mount 10 includes an elongated annular member 20 of metal having an upper tubular portion 22 which is joined to a lower tubular portion 24 of lesser diameter by an annular shoulder 26. The lower tubular portion 24 includes a plurality of circumferential slots 28 which provide a series of circumferentially spaced expandable ribs 30. As shown, each of the ribs includes a shallow radially outward bow or bend 32 intermediate the ends thereof. The slots and ribs are positioned intermediate the annular shoulder 26 and the internally threaded other end 34 of the tubular portion 24.

An annular body 36 of elastomeric material is bonded to the outer surface of the tubular portion 24 and the shape thereof generally corresponds to the shape of the slotted and rib portion of the tubular portion. The body includes an integral annular flange 38 which generally surrounds the tubular portion 20 and the shoulder 26.

An annular washer 40 seats on the upper open end of the tubular portion 22 and is bonded to the upper surface of the flange 38. It will be noted that the OD of the washer is less than that of the flange to provide for a better bond between the flange and the washer.

An annular washer 42 includes a plurality of circumferentially spaced apertures which provide for bonding of the washer to the lower surface of the flange 38. The washer further includes a circumferential rib 44 and a depending axial skirt or flange 46 which surrounds the upper unslotted portion of tubular portion 24.

Figure 5:
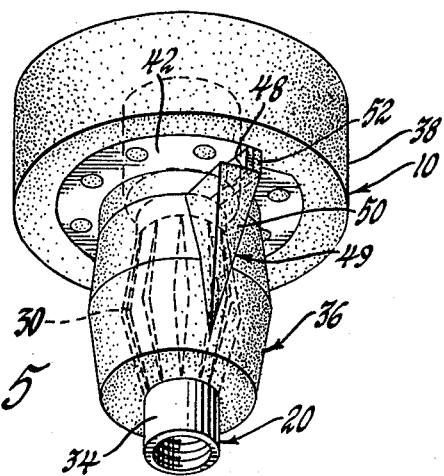
FIGURE 5 is an enlarged perspective view.

As best shown in FIGURE 5, a pair of integral lanced depending lateral tabs 48 are provided at circumferentially spaced positions on the washer 42.

A pair of ribs 49 are formed integral with the body 36 and flange 38. Each rib includes a lower portion 50 which tapers axially and circumferentially as it extends over the portion of the body 36 covering the ribs 30, and a thin upper portion 52 bonded to a respective lateral tab 48.

When it is desired to mount the body on the chassis, the body mount 10 is first inserted into an opening 54 provided in the bracket 14. The opening 54 includes a pair of slots 56 which receive the tabs 48 and connecting portions 52 of ribs 50.

Thereafter the body is dropped or positioned on the frame and a bolt and washer 58 are inserted through an aperture in the body bracket and into the annular member 20 of the body mount. When the bolt is threaded into engagement with the internally threaded end 34 of the body mount, the ribs 30 are expanded outwardly and axially compress the portion of the body 36 of elastometric material over the ribs against the lower surface of the bracket 14 to thereby secure the body to the frame.

The lateral tabs 48 of the washer 42 are engageable with one edge of each of the slots 56 in the body bracket to limit the rotation of the body mount relative to the frame bracket when the bolt 58 is threaded therein.

It will be noted that the annular shoulder 26 is generally axially and radially opposed to the rib 44 of the washer 42. When the bolt 58 is threaded into the body mount, that portion of the body 36 of elastomeric material between the shoulder and rib is tightly compressed as the annular flange 38 is compressed to provide for a rattle-free connection between the body and the frame.

The washers 40 and 42 also act as wear plates between the body and the frame respectively.

In the embodiment shown, there is access to the head of the bolt 58 and also access through bracket 14 to the other end 34 of the tubular portion 24. However, it is believed evident that if there were no access to the other end 34 of the member 24 through bracket 14, the body mount could still be installed very easily and quickly.

In certain installations, there may be access to the bracket 14 but no accesss to the body bracket 12. In such installations, the opening 54 and the slot 56 would be provided in the bracket 12 and the opening in the bracket 12 would be provided in the bracket 14. When the body mount is installed in the bracket 12 prior to the mounting of the body on the frame, it is slightly turned upon installation so that the washer 42 and the upper edges of the lower portions 50 of ribs 49 extend over the edge portions of the slots 56. This prevents the body mount from dropping out of the opening 54 prior to the time that the body is lowered on the frame.

Thus, access to the bolt head is required only either from the body or from the frame and not from both. The body mount of this invention is thus not limited to use on certain bodies but can be used on substantially all bodies. Additionally of course, there is no accessibility required to the internally threaded other end 34 of the body mount regardless of the type of installation.

Thus this invention provides an improved body mount.

I claim:

1. The combination comprising, a vehicle frame member, a vehicle body member, each member having an aperture therein, one member including at least one slot opening to the aperture therein, a body mount including an annular elongated member opening at one end to the aperture in the other member and having an expandable portion located to the other side of the aperture in the one member, an annular body of elastomeric material surrounding the annular member and including an integral annular flange having one surface thereof seating against the body member and the other surface thereof seating against the frame member to space the members relative to each other, means extending between the annular flange and the annular body through the slot and engageable with an edge of the slot to limit rotational movement of the body mount relative to the one member, and a bolt extending through the aperture in the other member and through the elongated member into threaded engagement with the internally threaded other end thereof to expand the expandable portion of the body mount and compress the portion of the annular body covering the expandable portion against the other side of the one member to clamp the body mount between the members.

2. The combination comprising, a vehicle frame member, a vehicle body member, each member having an aperture therein, one member including at least one slot opening to the aperture therein, a body mount including an annular elongated member opening at one end to the aperture in the other member and having an expandable portion located to the other side of the aperture in the one member, an annular body of elastomeric material surrounding the annular member and including an integral annular flange having one surface thereof seating against the other member, a rigid member bonded to the other surface of the flange and seating against the one member to space the body and frame members relative to each other, means on the rigid member extending from the annular flange to the annular body through the slot and engageable with an edge of the slot to limit rotational movement of the body mount relative to the one member, and a bolt extending through the aperture in the other member and through the elongated member into threaded engagement with the internally threaded other end thereof to expand the expandable portion of the body mount and compress the portion of the annular body covering the expandable portion against the other side of the one member to clamp the body mount between the members.

3. The combination comprising, a vehicle frame member, a vehicle body member, each member having an aperture therein, one member including at least one slot opening to the aperture therein, a body mount including an annular elongated member opening at one end to the aperture in the other member and having an expandable portion located to the other side of the aperture in the one member, an annular body of elastomeric material surrounding the annular member and including an integral annular flange having one surface thereof seating against the other member, a rigid annular member bonded to the other surface of the flange and seating against the one member to space the members relative to each other, the rigid member, including a lateral tab, extending through the slot and engageable with an edge of the slot to limit rotational movement of the body mount relative to the one member, an integral annular rib extending between the body and the flange through the slot and bonded to the tab, and a bolt extending through the aperture in the other member and through the elongated member into threaded engagement with the internally threaded other end thereof to expand the expandable portion of the body mount and compress the portion of the annular body covering the expandable portion and a portion and a portion of the annular rib against the other side of the one member to clamp the body mount between the members.

4. The combination comprising, a vehicle frame member provided with an aperture therein, a vehicle body member located to one side of the frame member and having an aperture therein opening to the frame aperture, one member including at least a pair of slots opening to the aperture therein, a body mount including an annular elongated member opening at one end to the aperture in the other member and having a circumferential series of axial slots therein located to the other side of the aperture in the one member and defining a circumferential series of expandable ribs, an annular body of elastomeric material surrounding the annular elongated member and including an integral annular flange having one surface thereof seating against the other member, a rigid annular member bonded to the other surface of the flange and seating against the one side of the one member to space the body and frame members relative to each other, the rigid member including at least a pair of lateral tabs, each respective to one of the slots and having one side thereof engageable with an edge of a respective slot upon limited rotational movement of the body mount relative to the one member, at least a pair of axially extending ribs of elastomeric material formed integral with the annular elastomeric body and flange and extending between the annular elastomeric body and the other surface of the flange, each rib including an upper portion bonded to a respective tab and a lower portion tapering axially and circumferentially and having an upper edge engaging the one side of the one member upon limited rotational movement of the body mount and cooperating with the rigid member and respective tab to detachably secure the body mount to the one member, threaded means on the annular elongated member adjacent the other open end thereof and to the other side of the one member, and a threaded member and through the annular elongated member and engageable with the threaded means to move the other open end of the annular elongated member toward the one end thereof and thereby expand the expandable ribs and in turn compress the portion of the annular elastomeric body covering the expandable ribs and the lower portion of the elastomeric ribs against the other side of the one member to clamp the body mount to the body member and frame member.

References Cited

UNITED STATES PATENTS 2,838,339    6/1958    Schaldenbrand _____ 296—35
3,193,237    7/1965    Adams _____ 296—35 X LEO FRIAGLIA, Primary Examiner J. A. PEKAR, Assistant Examiner U.S. Cl. X.R.

85—71; 248—15

PO-1050
(5/69)

UNITED STATES PATENT OFFICE
CERTIFICATE OF CORRECTION

Patent No. __3,479,081__  Dated __November 18, 1969__

Inventor(s) __Henry W. Schaaf__

It is certified that error appears in the above-identified patent and that said Letters Patent are hereby corrected as shown below:

Column 1, last line, "detchably" should read -- detachably --

Column 2, line 22, "vehcile" should read -- vehicle --;
         line 28, before "fragmentary" insert -- a --.

Column 3, line 21, "elastometric" should read
         -- elastomeric --.

Column 4, line 62, "and a portion" should be deleted.

Column 6, line 3, after "member" (first occurrence) insert the following words:
         --extending through the aperture of the other member --.

SIGNED AND
SEALED
JUL 7 1970

(SEAL)
Attest:

Edward M. Fletcher, Jr.
Attesting Officer

WILLIAM E. SCHUYLER, JR.
Commissioner of Patents